(12) United States Patent
Liebenow

(10) Patent No.: US 7,215,749 B1
(45) Date of Patent: May 8, 2007

(54) TIME, DATE AND ORIGINATING NUMBER DISPLAY PROVIDED TO CALLING PARTY

(75) Inventor: Frank Liebenow, Dakota Dunes, SD (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/572,527

(22) Filed: May 17, 2000

(51) Int. Cl.
*H04M 1/56* (2006.01)
*H04M 15/06* (2006.01)
*H04M 11/00* (2006.01)
*H04M 15/00* (2006.01)

(52) U.S. Cl. .............................. 379/142.01; 379/93.23; 379/114.02; 379/142.17; 379/245

(58) Field of Classification Search ............. 379/142.1, 379/142.11, 142.01, 93.17, 93.23, 252, 229, 379/373, 142.06, 88.21, 130, 120, 201.08, 379/201.04, 201.01, 201.02, 245, 142.17, 379/114.02
See application file for complete search history.

(56) References Cited

U.S. PATENT DOCUMENTS

| | | | |
|---|---|---|---|
| 5,396,548 A * | 3/1995 | Bayerl et al. .......... 379/142.01 |
| 5,539,809 A * | 7/1996 | Mayer et al. .............. 379/67.1 |
| 5,608,788 A * | 3/1997 | Demlow et al. ........ 379/142.01 |
| 5,732,128 A * | 3/1998 | Bushnell ................ 379/127.01 |
| 5,799,060 A * | 8/1998 | Kennedy et al. .............. 379/29 |
| 5,799,072 A * | 8/1998 | Vulcan et al. .......... 379/114.01 |
| 5,917,897 A * | 6/1999 | Johnson et al. ............. 379/114 |
| 6,005,921 A * | 12/1999 | Keefe et al. .................. 379/27 |
| 6,088,432 A * | 7/2000 | He ......................... 379/114.01 |
| 6,091,804 A * | 7/2000 | Banerjee .................. 379/93.01 |
| 6,115,458 A * | 9/2000 | Taskett ................... 379/144.01 |
| 6,266,404 B1* | 7/2001 | Chon et al. ................. 379/201 |
| 6,289,090 B1* | 9/2001 | Tessler et al. .......... 379/207.02 |
| 6,310,944 B1* | 10/2001 | Brisebois et al. ....... 379/142.01 |
| 6,317,490 B1* | 11/2001 | Cameron et al. ...... 379/114.01 |

* cited by examiner

*Primary Examiner*—Binh Tieu
(74) *Attorney, Agent, or Firm*—Jeffrey A. Proehl; Woods, Fuller, Shultz & Smith

(57) ABSTRACT

For analog telephone service subscribers, an apparatus and a method is provided for displaying a caller's originating number and/or the current time of day on the subscriber's incoming call line identification equipment. The subscriber's originating telephone number is obtained from a database within the telephone switching system providing POTS service to the subscriber. The time of day is obtained from a real-time clock within or in communication with the telephone switching system. Data is preferably transmitted to the subscriber's equipment by analog frequency shift keyed protocol.

46 Claims, 6 Drawing Sheets

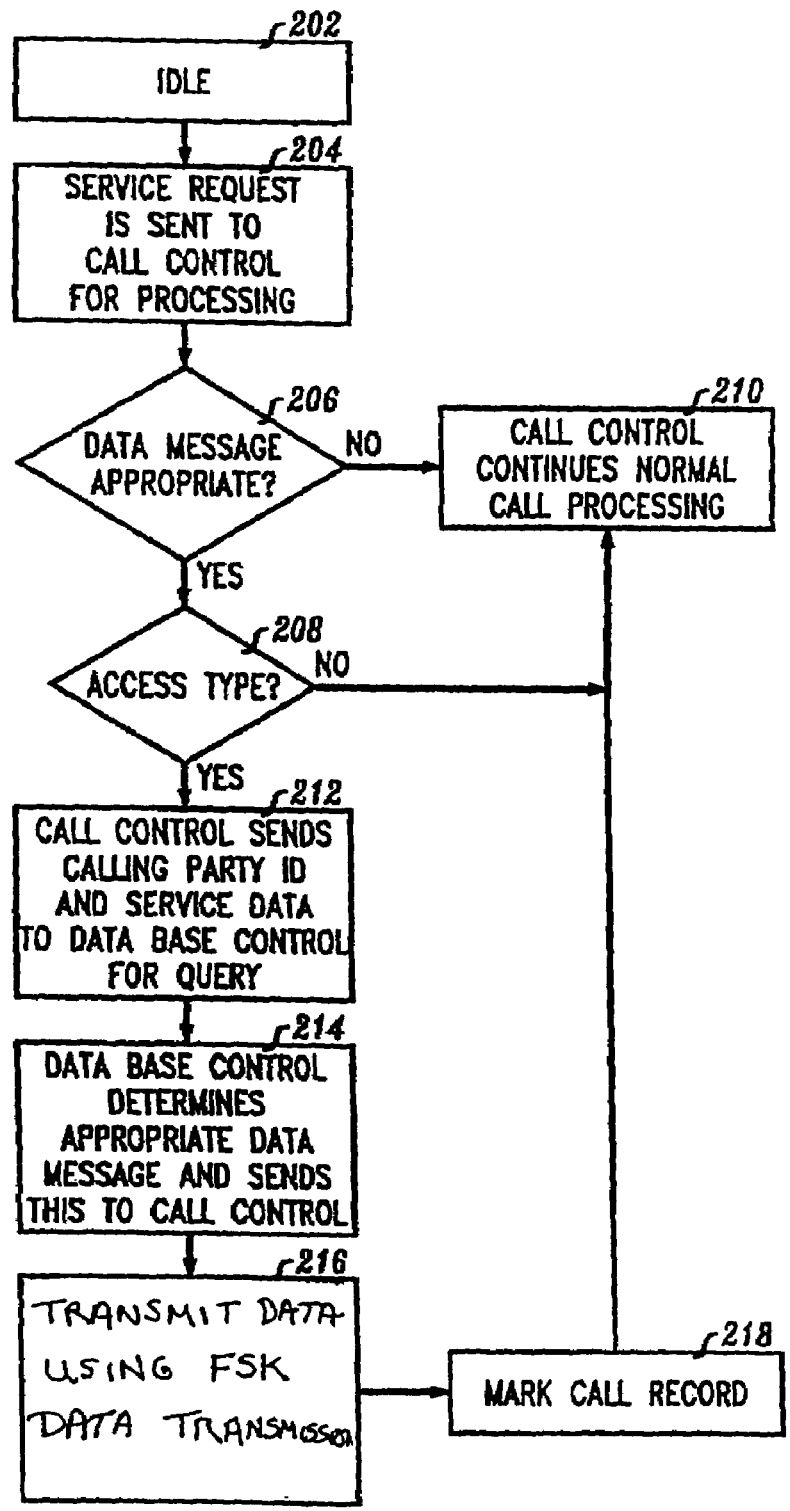

ICLID STATE DIAGRAM

PRIOR ART

TIME, DATE AND ORIGINATING NUMBER DISPLAY PROVIDED TO CALLING PARTY

BACKGROUND OF THE INVENTION

1. Field of the Invention

This invention relates to a method and apparatus for displaying information to a telecommunications station. More particularly, this invention relates to an improvement for analog telephone station displays wherein the display includes originating number identifying information and/or the date and/or time of day information.

2. Description of the Related Art

A service which has become more and more popular in recent years is one for indicating to a called customer the identification of the caller. With conventional analog telephones, this service, called incoming calling line identification (ICLID) or Caller ID, is provided through the Public Shared Telephone Network (PSTN) by means of an auxiliary display on the called party's telephone equipment which receives information from the PSTN identifying the calling party between the first two rings and uses the received information to display the number of the calling party. A problem of the prior art is that, for analog lines, while ICLID does provide information to help the called customer on incoming calls, ICLID does not provide certain significant information from the telecommunications network to help the calling customer on outgoing calls, or while a customer is idle or talking.

U.S. Pat. No. 5,608,788 to Demlow et al. describes a partial solution to this problem. That patent, for an information display provided to the calling party, teaches displaying many types of information on the calling telephone, including the following: (1) the name of the called customer; (2) a motto, slogan, advertising, or cost message from the called customer; (3) information to give the calling party additional options, such as automatic callback or an invitation to leave a voice message; (4) information from the central office reporting conditions such as overload; (5) a service identification mark from the central office switching system and/or an inter-exchange carrier. Useful as this information is, there is additional information that is perhaps more useful to a calling party that is not taught by Demlow.

Under various circumstances, it is desirable for a calling party's telephone equipment to be provided with the originating number identifier (ONI, or simply the telephone number) of the calling telephone line. For example, a calling party may wish to determine whether a call directed to a particular terminating number (terminating number identifier or TNI) is a toll call from the calling party's telephone line. Such a determination may be made if the ONI of the call is known. In further example, for calling arrangements where toll charges are ONI-TNI dependent, a calling party will need the ONI to calculate the toll charges to a particular TNI. In yet further example, the calling party's telephone equipment may have generic Least Cost Routing (LCR) software installed, that can determine and execute the least expensive route for a particular telephone call. LCR determinations typically require the telephone equipment to possess both ONI and TNI information. In yet further example, in circumstances where the calling party wishes to direct a called party verbally to call the calling party back at the calling party's ONI, the calling party must know his ONI to be able to provide that information. In other situations, the calling party may connect his own telephone equipment to the telephone line, for example a modem operatively coupled to a computer. The calling party's equipment in such situations may need to have the ONI of the telephone line to determine which of a plurality of available service access numbers are appropriate for the ONI's calling area; for example where the equipment is a computer with modem and the service to be accessed is an Internet connection, based upon the ONI the computer may determine an appropriate local access TNI for Internet service from a database within the computer. For these and other reasons, what is needed is a way for a calling party (or the calling party's telephone equipment) to obtain the originating number identifier from the public shared telephone network.

Under various circumstances also, it is desirable for the calling party's telephone equipment to be provided with the current date and/or time of day by the PSTN. For example, some LCR determinations may be based upon toll structures that are time of day and/or day of week dependent. While LCR in the prior art relies on time of day and day of week data from clock/calendar functionality inherent in the LCR equipment, obtaining date and time information directly from the PSTN may provide a greater degree of accuracy in LCR determinations. In more general terms, date and time of day information provided on demand in a simple and readily accessed form from an authoritative source can be utilized to great advantage by a telephone subscriber in many ways: this information, obtained from the PSTN, may be applied, not only to equipment related to telecommunications over the telephone line, but also throughout the telephone subscriber's home or office, in programming various devices and actions that are date and/or time dependent. For these and other reasons, what is needed is for a calling party (or simply a telephone subscriber) to obtain date and/or time of day information from the PSTN.

SUMMARY OF THE INVENTION

In accordance with the principles of this invention, in a telecommunications network having a switching system for serving a calling customer, an advance is made over the prior art by providing the calling customer with specific data supplied from or via a connected central office prior to, or during, the time that the calling party is dialing and/or while the called customer is being alerted (i.e., while the called telephone is ringing), and, for appropriately equipped stations, after the call has been established. The specific data to which this invention relates is the originating telephone number and/or the current time-of-day and/or date. Depending on the circumstances, this information supplied to the calling customer may come from a database shared by a plurality of central office switching systems, from a database of the central office switching system connected to the customer, or from a switching system real-time clock. This information may be accessed using a signaling network such as the CCS7 network which is currently employed to help establish calls and for conveying the calling number to the called customer for ICLID. The information is provided in response to a signal, such as a supervisory signal or a series of signals such as those for conveying a dialed number.

In accordance with one specific embodiment of the invention, the device that is used to display information to the calling party is an ICLID device, heretofore used only for displaying the incoming number to called parties and such additional information as taught by Demlow to calling parties. As in Demlow, in this embodiment the calling customer receives a frequency shift keyed (FSK) signal for controlling an ICLID display device, either while the station is idle, or when off-hook but prior to receiving audible tone, or between bursts of audible tone when the called party is being alerted (the audible tone may interfere with FSK signaling), or when the telephone station is in the talking state.

In accordance with this embodiment, the originating number identifier and/or the date and/or time of day can be displayed on the calling telephone.

BRIEF DESCRIPTION OF THE DRAWINGS

FIGS. 2–3b are flow diagrams of various methods of processing calls and transmitting data to the ICLID device of a calling party's off-hook station in accordance with the invention;

DETAILED DESCRIPTION OF THE PREFERRED EMBODIMENTS

Figure 1:
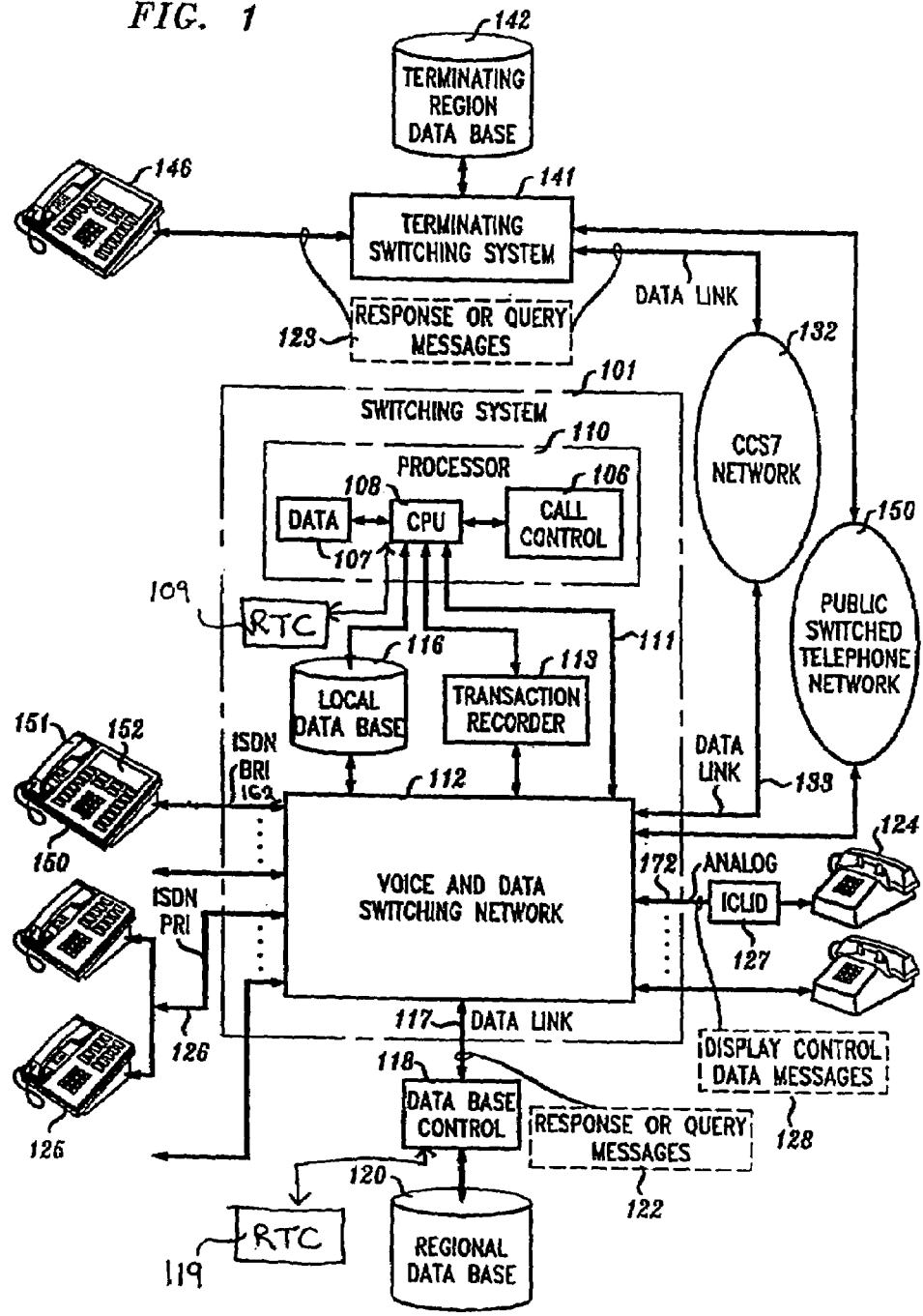
FIG. 1 is a block diagram of a telecommunication network for processing customer information in accordance with the methods of FIGS. 2–5.

FIG. 1 is an architectural block diagram illustrating the operation of the invention. The switching system (switch) 101 is a 5ESS.® Switch, extensively described in AT&T Technical Journal, Vol. 64, No. 6, part 2, pp. 1305–1564, July/August 1985, and manufactured by AT&T, which has capabilities for switching both voice and data, as described in Beckner et al., U.S. Pat. No. 4,592,048. This switch is adapted, for example, to handle integrated services digital network (ISDN) telephone stations such as telephone station 150, to which the present invention is not directed. The ISDN telephone station set 150, comprises a handset 151 and display 152. This station set is equipped with an CCITT ISDN Basic Rate Interface (BRI), as described in CCITT Red Book Fascicle III.5 Series 1 Recommendation and has the capability of handling standard Q.931 interface, as described in CCITT Red Book Fascicle VI.9 Recommendation Q.931. This switch is equipped to deal with station sets served via the basic rate interface (BRI) 162, or as telephone station 125 shows, those station sets served via the primary rate interface (PRI) 126.

Even though this description is directed in detail to a switch that may be adapted to serve ISDN stations, it will be appreciated by those of ordinary skill in the art that if only analog telephones are served by a particular switch, the invention can be practiced for those telephones equipped with ICLID devices even if the serving central office switching system cannot serve ISDN stations.

In any case, since the present invention is not directed to ISDN telephones but rather to analog telephones, it is more relevant to the present description that the switching system also has the capabilities for dealing with ordinary analog telephones such as telephone station 124 equipped, in this case, with an incoming calling line identification (ICLID) device 127 via an analog line 172. Further, the switching system can support a data link like 117 to serve peripheral control devices like database control 118 with a regional database 120 and optional database real-time clock 119. Also, switching system 101 can support data link 133 to access other switching systems via the CCS7 network 132 which interfaces switching system 141 serving station set 146 and regional database 142. Switching systems 101 and 141 are interconnected via the public switched telephone network (PSTN) 150 which is considered to include local exchange and inter-exchange networks.

The switch 101 comprises a processor 110 for controlling the switch. The processor 110, in turn, comprises a central processing unit 108, a stored call control 106 program for controlling the operations of the central processing unit, and call data 107. The switch also comprises a local database system 116, storing data such as: (1) customer lines connected to the system, such as the Q.931 equipped customer line 162, (2) interconnecting networks 132, (3) data links, such as data link 133 connected to the system, and (4) data about the database control 118 connected to the system via data link 117. CPU 108 controls a transaction recorder 113 such as a magnetic tape unit which records billing information associated with services offered in accordance with applicant's invention. CPU 108 accesses a real-time clock 109, for supplying time-of-day and/or date data for various data processing functions associated with the operation of switch 101, including billing recordation functions performed by transaction recorder 118. CPU 108 also accesses a local database system 116 for supplying data for display at telephone stations connected to switching system 101 or for supplying data in response to requests received from CCS7 network 132 over data link 133. The switch also comprises a voice and data switching network 112 which can be used for transmitting data among processor 110 and database control 118, and for transmitting voice and data among data links coming into the system, such as data link 133 to CCS7 Network 132, and customer lines such as customer line 172. The CCS7 Network 132 which may include one or more switching systems is used for accessing the called station 146 from switch 101. Voice and data switching network 112 is connected to control unit 110 via a control connection 111. Voice and data switching network 112 is further connected to data base control 118 via data link 117.

The change required in the switching system to implement the present invention is the addition of a program in the processor 110 of the switch for executing the tasks described in the flow charts of FIGS. 2–5. It is to be understood that depending on circumstances, the information being supplied to the calling customer may come from the local database 116, or from a database shared by a plurality of central office switching systems, like the regional database system 120, from data base real-time clock 119 or directly from system real-time clock 109. The database control 118 and regional database 120 are used for obtaining data about the calling or called terminal and/or called station set when this data is either requested by the local database system 116 or initiated by the database control 118 itself Either data base real-time clock 119 or system real-time clock 109 is used for obtaining time-of-day and/or date data when initiated by control 118.

In ISDN applications, unrelated to the present invention, a service request is generated from the ISDN station set 150 when the calling party lifts the handset 151, which sends a Q.931 SETUP message over the BRI line 162 to the switching system 101. In analog applications, germane to the present invention, when the calling party's telephone station 124 goes "off-hook", the station equipment changes the impedance on analog line 172, which is treated as a service request by the network 112, as is well known to those of ordinary skill in the art. In any case, a service request is detected by the voice and data switching network 112 and relayed via control connection 111 to call control 106 in processor 110. Call control 106 then sends calling party identification and line status query message 122 to the database control 118 via the data link 117. The database control 1118 queries the regional database 120 over the data link 117. For embodiments of this invention that provide the ONI to the calling party, the composition of data message 122 comprises information obtained from this query. In embodiments of this invention that provide the time-of-day and/or date to the calling party, the composition of data message 122 comprises such information obtained either from database real-time clock 119 or from system real-time clock 109. Data message 122 is sent to the voice and data switching network via data link 117 for delivery to call control 106 via data link 111.

In alternative embodiments, database control 118 may initiate a line status query message 122, without having first received any service request. In addition, database control 118 may compose a data message 122 comprising date and/or time-of-day information from real time clock 109 or 119, again without the requirement of a service request. In this manner, data message 122 comprising ONI and/or the date and/or time-of-day may be composed by database control 118 while analog station 124 is idle.

In some embodiments of this invention, call control 106 can send data message 122 periodically to ICLID device 127 for display while analog station 124 is idle (on-hook). In other embodiments, call control 106 can send data message 122 to ICLID device 127 for display after the completion of dialing (to avoid interferences with dialing tone signals). Such data can be returned to the ICLID device after completion of dialing and before audible ring is returned to the calling party, or between bursts of audible tone. Alternatively, this data can be sent prior to returning dial tone. In any case, because the ICLID device is connected to an analog line, requiring in-band signaling, it is desirable to avoid conflicts or interferences between the frequency shift keyed signal (1200 and 2200 Hz) and the dial tone signals, or audible tone signals.

Summarizing the processing of information resulting in the display sent to ICLID device 127, data message 122 is a query message to request information from the database system 120 and/or data base real-time clock 119 or system real-time clock 109. Query data message 122 may originate from database control 118 in response to a service request; alternatively, database control 118 may, on its own, initiate query data message 122. This query data message may include the date and/or time-of day, the calling number, line status, and the called number, the called number being used to identify the response that should be sent back to callers of that number. Message 122 is also a response message, comprising data obtained in response to a query. Significantly for the present invention, while the prior art teaches that a query data message 122 sent within the telephone network for processing queries may include the calling number ONI, nowhere is it taught for analog telephones that response message 122 ultimately transmitted to ICLID device 127 in response to a query contains the calling number ONI or the time-of-day and/or date.

FIGS. 2–5 are flow diagrams of the method of certain embodiments of the present invention. These figures depict the operation of the information display service arrangement, comprising the calling party analog telephone set 124, ICLID device 127, the switching system 101 and the regional database control 118. Calls that are treated in accordance with the principles of this invention are information display calls. Other calls are given treatment by "normal call processing" signifying treatment in accordance with the normal practices for calls.

A prior art circuit used to transmit data from a switch to the ICLID device described in C. R. Doughty, U.S. Pat. No. 4,551,581. This prior art circuit can be modified in a straightforward manner to transmit data in the absence of transmitting a ringing signal, or to transmit data between bursts of audible tone or during other caller off-hook or on-hook states or to disconnect audible tone while transmitting a data message. Data messages to be transmitted before the caller dials are transmitted before dial tone is applied.

FIG. 2 describes the ICLID display 127 (FIG. 1) prior to dialing and starts at the point where the station set is idle (action block 202). When a calling party requests service (goes off-hook) a service request message arrives at the switching system which passes it on to call control for processing (action block 204). If the information display treatment is appropriate (test 206), it checks the access type (test 208) for proper ICLID display. If either test fails (test 206 or 208), the call is given normal call processing treatment (action block 210). If both tests pass (test 206 and 208) call control sends customer identification and service requirements information to data base control (action block 212). Data base control 118 (FIG. 1) determines the appropriate information data message (in the case of this invention, ONI data and/or the date and/or time-of-day) and delivers this message to call control 106 (FIG. 1) (action block 214). Call control transmits this message using FSK data transmission (action block 216), marks the call record (action block 218), and returns to normal call processing (action block 210).

In transmitting the message to ICLID device 127 (FIG. 1), care must be taken to avoid conflicts between the frequency shift keyed signal and the dial tone signals or audible tone signals, as stated previously. The Analog Display Services Interface (ADSI) described in TA-1273 issued by Bellcore permits FSK signaling to be provided off-hook; this system mutes the station receiver while FSK carrier signals are transmitted, so that a party on the receiver does not hear a loud burst of tone when FSK data is transmitted. Such a system cannot be used for signaling while the caller is dialing, however, since at least one of the dial tone multi-frequency (DTMF) signals interfere with the FSK signal. Accordingly, some embodiments of this invention transmit the message to a station after the station has gone off-hook but before transmitting the dial tone that indicates that digits may be dialed.

Figure 3A:
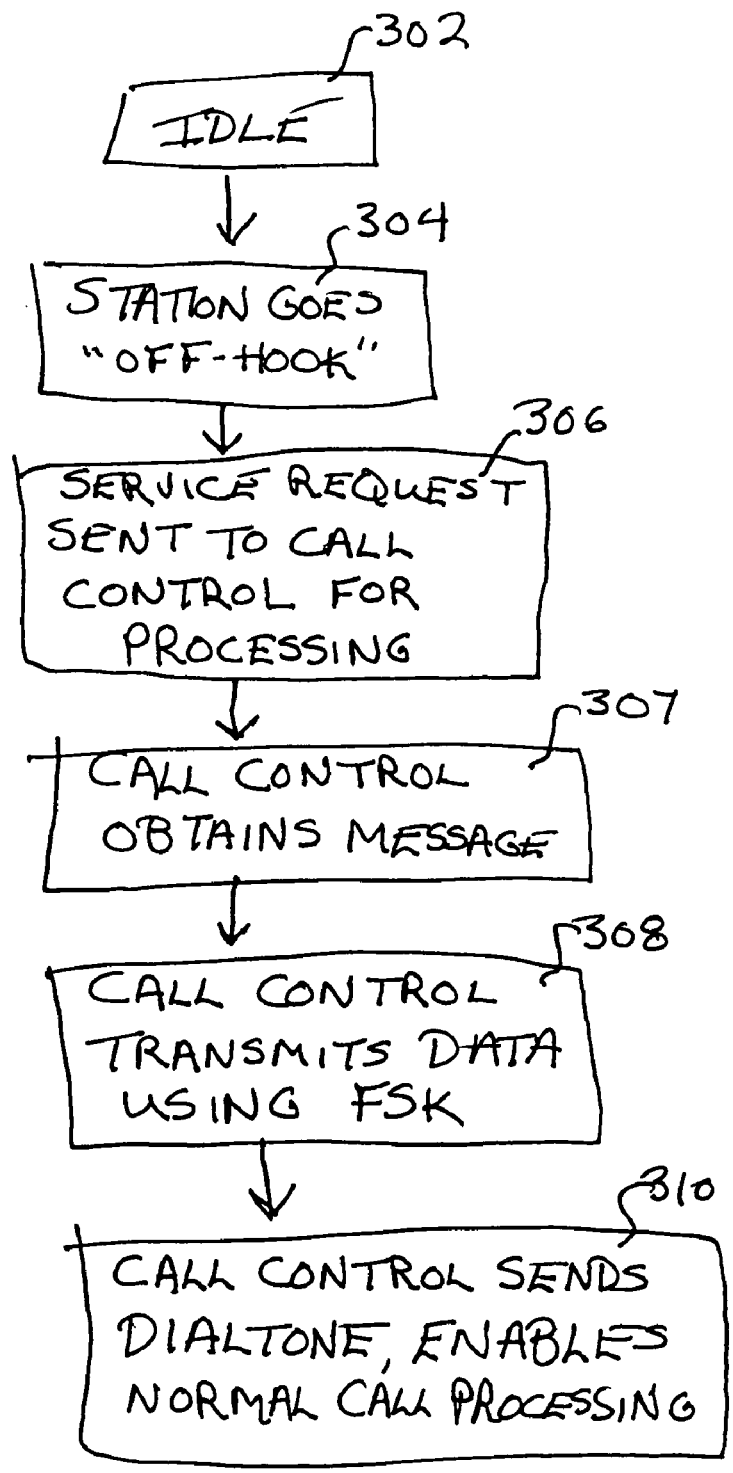

Referring to FIG. 3a, an idle station 302 goes off-hook 304, generating a service request to call control for processing 306. Steps 307 to 308 represent call control activity shown in steps 204 through 216 in FIG. 2. After call control transmits data using FSK data transmission 308, dialtone is sent to the customer equipment and normal call processing is enabled under call control 310.

Figure 3B:
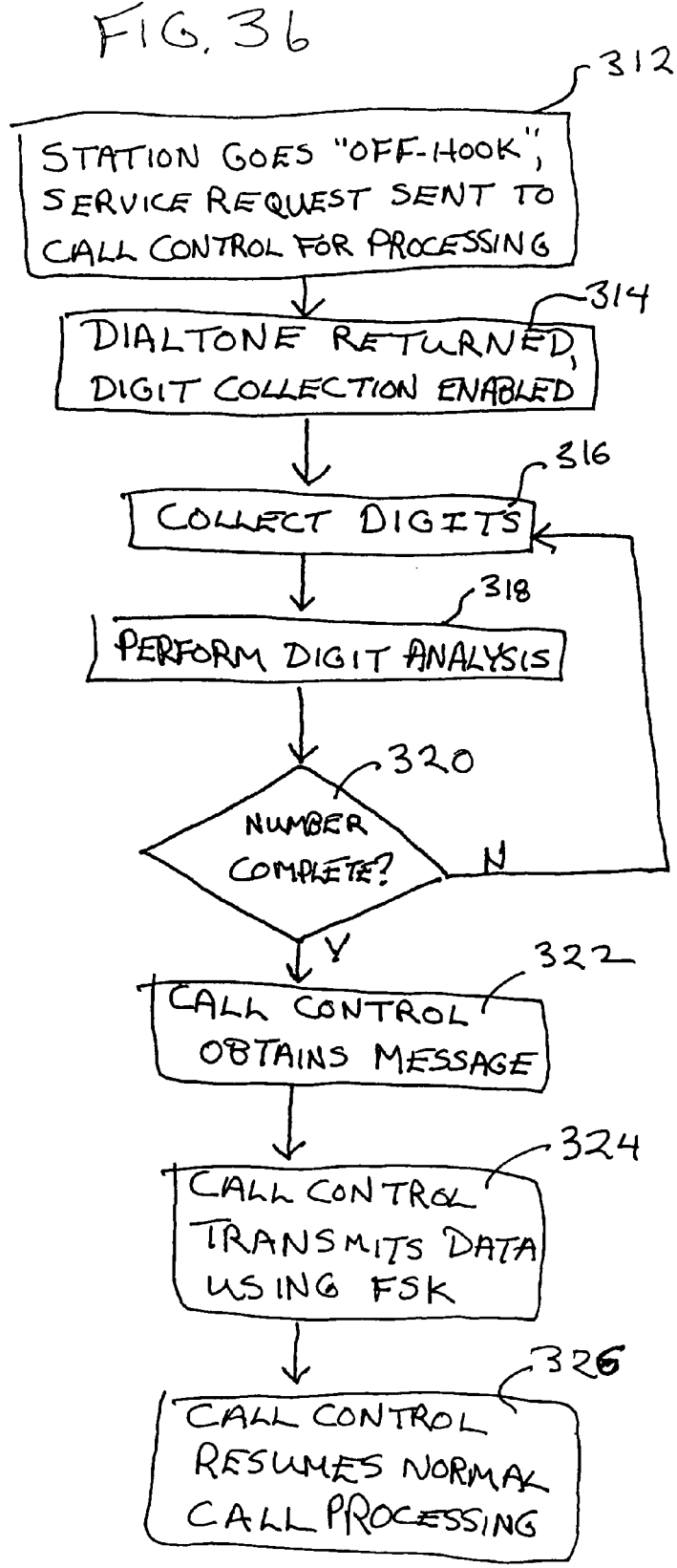

In other embodiments, after dialing is complete, as detected by the switching system, signals may be sent to the calling station. Referring to FIG. 3b, an embodiment is shown that transmits the message of the present invention immediately after dialing is complete before connecting the call. A station goes off-hook generating a service request to call control for processing 312. In response, call control returns dialtone and enables digit collection 314. Call control collects digits as dialed 316 and performs digit analysis 318. Determining that a complete number has been dialed 320, call control performs a query and obtains a message 322 as in 212 and 214 (FIG. 2). Call control then transmits the message as data using FSK data transmission 324. Subsequently, call control resumes normal call processing at 326.

In yet other embodiments as described earlier, FSK data according to the present invention may be transmitted after call processing is complete, wherein a device such as that described in Doughty may receive such data between "ring" or "busy" tones sent by the system to the station.

Any other signaling arrangement for providing data while the caller is off-hook can also be used, some of these arrangements use a lower power level to transmit digital information so that the caller's ear is not subjected to an excessively loud signal. Data over voice signaling arrangements, well known in the prior art, can provide a convenient method of signaling to an analog station at essentially any time (other than during ringing).

Figure 4:
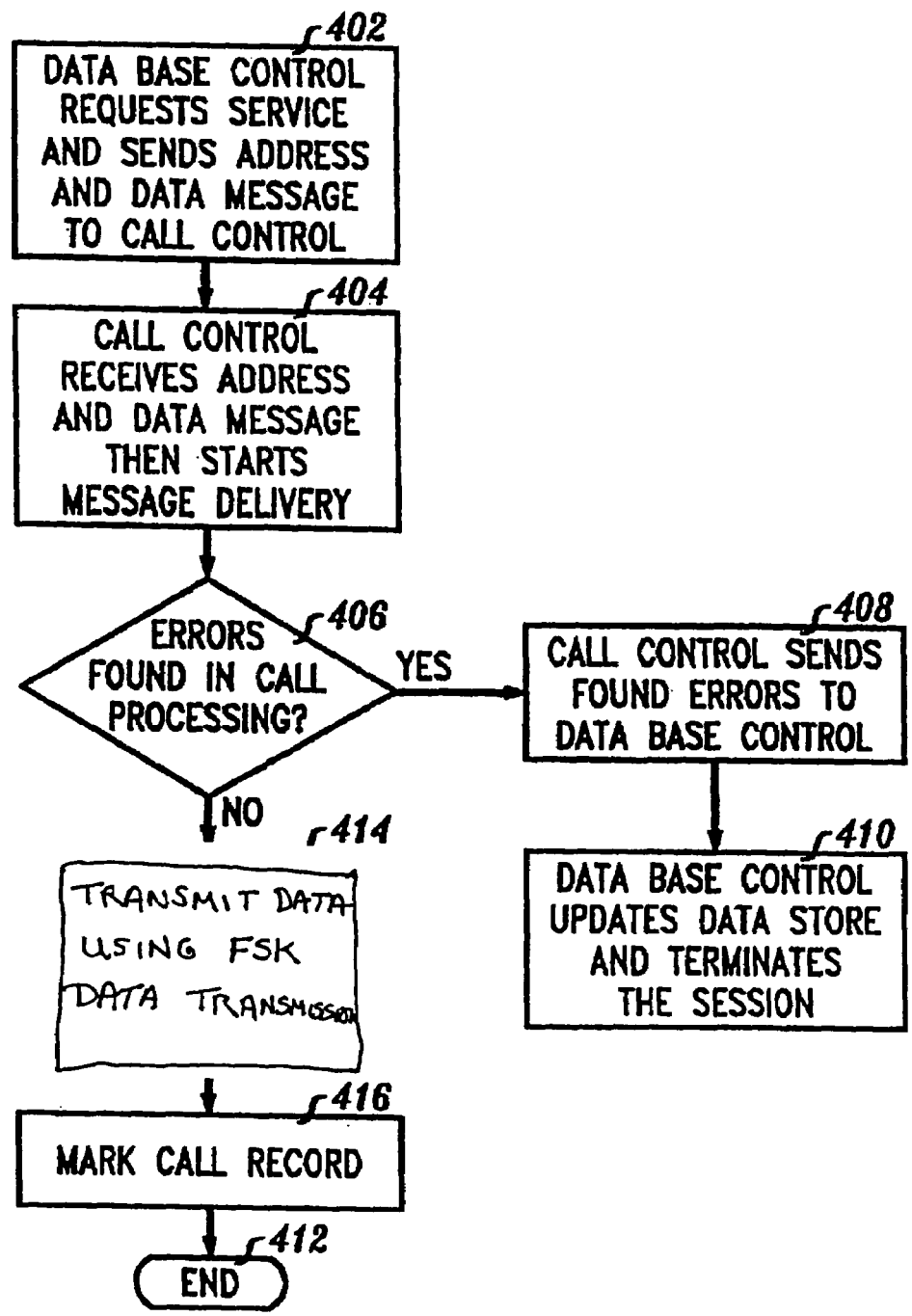
FIG. 4 is a flow diagram of a method of transmitting data in accordance with the invention to an ICLID device when a station is idle (on-hook)

FIG. 4 describes the ICLID display 127 (FIG. 1) for on-hook messages and starts with the data base control 118 (FIG. 1) initiating a request to send a message by sending address information and a data message to call control (action block 402). The data message is generated without receipt of a request from the station. The data message may be generated as a result of changes in the date and/or time of day information from system real-time clock 109 (FIG. 1) or data base real-time clock 119 (FIG. 1). Alternatively, the data message may be generated periodically or simply from time to time, according to programming within switching system 101, by various means well known to those of ordinary skill in the art. The terms "off-hook" and "on-hook" as used herein refer generically to the active or inactive supervisory states of any telecommunications terminal. In the present invention, messages comprise ONI and/or date and/or time-of-day information. If several messages are queued for a caller, these can be transmitted sequentially prior to providing dial tone. Call control receives the data message and address information and starts message delivery (action block 404). If no address information errors are detected by call control (test 406), call control transmits the data using FSK data transmission (action block 414) and marks the call record (action block 416), and ends the session (action block 412). If call address errors are detected by call processing (test 406), call control sends this information to data base control (action block 408). Data base control then updates the regional data base system and terminates the session (action block 410).

Figure 5:
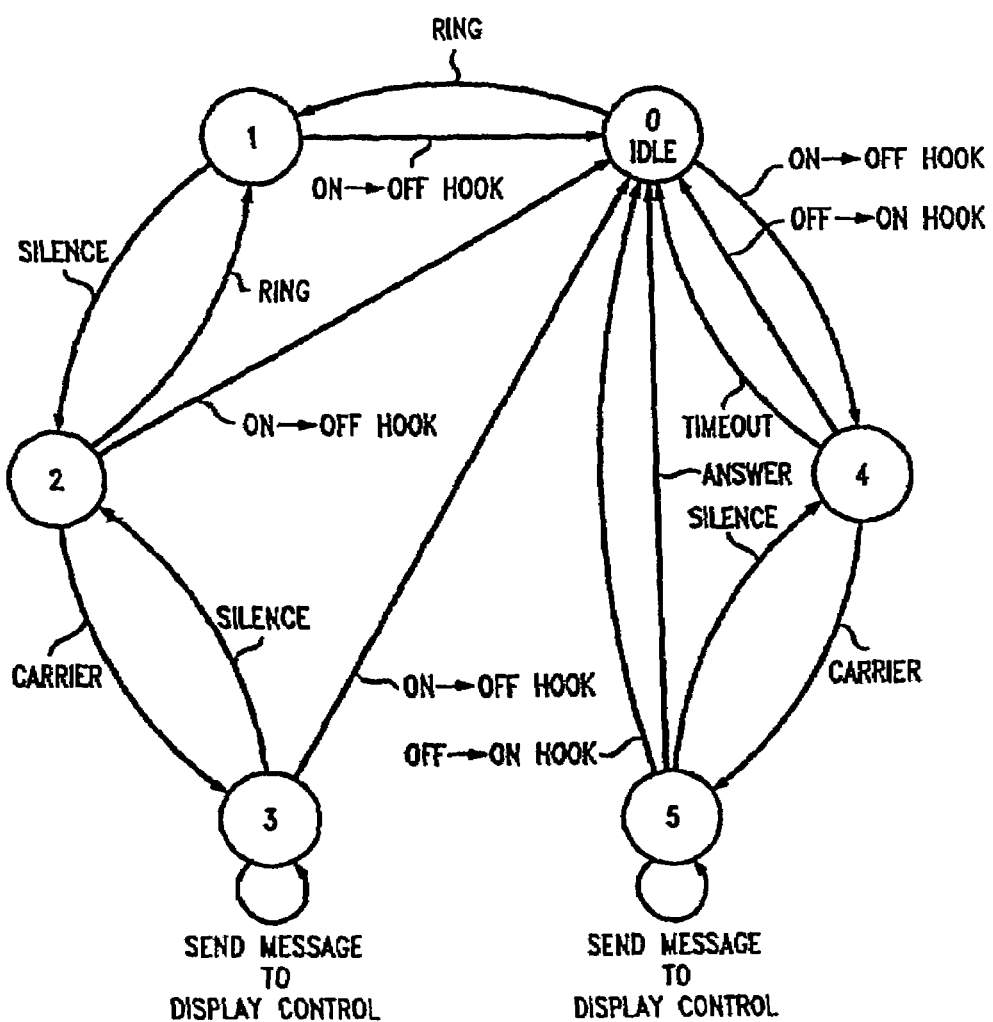
FIG. 5 is a state diagram of an ICLID device for practicing the invention.

FIG. 5 is a prior art state diagram of an ICLID device 127 as taught by Demlow. A prior art circuit is described in C. R. Doughty, U.S. Pat. No. 4,582,956. The prior art circuit is controlled according to the first four states of the state diagram of FIG. 5. Initially, the connected telephone station is on-hook and the circuit is idle (state 0), and, when ringing is detected it goes into state 1. When subsequent silence is detected, the circuit goes into state 2. From state 2, if a frequency shift key (FSK) carrier signal is detected, the ICLID circuit goes into state 3 and when in state 3, FSK signals are detected and passed to a display control system. If carrier is no longer detected, the ICLID circuit reverts to state 2. If in any one of the states 1, 2, or 3, a transition from on-hook to off-hook is detected, the ICLID circuit goes back to the idle state 0.

In order to accomplish the objectives of this invention, three more states (states 4–6) are added to the ICLID control as set forth in Demlow. When the ICLID circuit is in the idle state (state 0) and a transition from on-hook to off-hook is detected, the ICLID circuit goes into new state 4. While in state 4, if a FSK carrier is detected, the ICLID circuit goes into new state 5, and, in new state 5, detects FSK messages which are then transmitted to the display control. While in state 5, the calling station earphone is disabled so that the caller cannot hear the FSK signals. If absence of carrier is detected the ICLID circuit goes back into state 4. While in either state 4 or state 5, if the telephone instrument goes from off-hook to on-hook, the ICLID circuit goes back to the idle state 0. In addition, if while in state 5 or state 4, an answer signal is recognized, the ICLID circuit goes back to the idle state 0. (At this time, the message can be retained until the subscriber goes on-hook; while in state 0, a transition from off-hook to on-hook is ignored in this embodiment). The answer signal is recognized at switching system 101 in order to allow charging for the call to begin. The answer signal to the ICLID device while in state 5 can be a specific brief FSK message from either switch 101 or terminating switching system 141. The transition from state 4 to state 0 may also be accomplished by a simple timeout. In addition, if FSK carrier is detected while on-hook or off-hook (in state 0, idle) the ICLID circuit goes to state 6, in which it can receive data messages. If the FSK carrier disappears, the ICLID circuit goes back to idle (state 0).

The "display" discussed herein may be visual static (characters or graphical), visual dynamic, audible, or tactile (for use by disabled users), and may be in one or more media (e.g., audible and visual). Accordingly, instead of delivering the information for visual display, the process could alternatively relay the information as a voice message, as a video message, as data or as any other kind of out-of-band signal message.

The display itself can be controlled by a processor with memory in the terminal, which can then display a stored or generated result, selected and possibly modified by the received data. Further, the display device may be simply a receiving device operatively connected to equipment at the station for further processing and/or display of the message data sent according to the present invention.

Although the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

I claim:

1. A telecommunications network for establishing connections between two station sets within a plurality of station sets comprising:
   a switching system;
   a plurality of station sets served by said switching system; and
   means for sending information related to a first station set to said first station set, said information being sent in response to said first station set signaling said switching system that the first station set is transitioning from an inactive condition to an active condition;
   wherein said inactive condition is characterized by said first station set being on-hook and said active condition is characterized by said first station set being off-hook.

2. The telecommunications network according to claim 1, wherein said information includes a current date.

3. The telecommunications network according to claim 1, wherein said information includes a current time.

4. The telecommunications network according to claim 1, wherein said information includes identification information related to said first station set.

5. The telecommunications network according to claim 1, wherein said identification information related to said first station set includes a telephone number associated with said first station set.

6. The telecommunications system according to claim 1, wherein said means for sending is configured to transmit a frequency shift key (FSK) data message.

7. The telecommunications system according to claim 1, wherein said first station set displays said information.

8. The telecommunications system according to claim 1, wherein said first station set stores said information for future use.

9. The telecommunications system according to claim 1, wherein said first station set uses said information to set at least one of an internal date and clock of the first station set.

10. The telecommunications system according to claim 1, wherein said first station set is an analog phone.

11. The telecommunications system according to claim 1, wherein said first station set is a computer connected to said switching system through a modem.

12. The telecommunications system according to claim 11, wherein said computer uses said information to set at least one of an internal date and clock of the computer.

13. The telecommunications system according to claim 11, wherein said computer uses a telephone number within said information to determine a least cost terminal number when the computer can choose between a plurality of terminal numbers to dial.

14. The telecommunications system according to claim 11, wherein said computer uses a telephone number within said information to determine a terminal number when the computer can choose between a plurality of terminal numbers to dial.

15. The telecommunications system according to claim 1, wherein said sending information is performed before said switching system presents dial tone.

16. The telecommunications system according to claim 1, wherein said sending information is performed while said switching system presents dial tone.

17. The telecommunications network according to claim 1, wherein said signaling comprises the first station set going off-hook.

18. The telecommunications system according to claim 1, wherein said sending is performed before said first station set initiates dialing.

19. The telecommunications network according to claim 1, wherein the transitioning from the inactive condition to the active condition is caused by lifting a handset of the first station set.

20. In a telecommunications network including a switching system and a plurality of station sets served by said switching system, a method for providing information related to one station set of said plurality of station sets in response to said one station set becoming active comprising:
    collecting information related to said one station set at a line interface unit of said switching system; and
    sending said information related to said one station set to said one station set in response to said one station set signaling said switching system that said one station set is transitioning from an inactive condition to an active condition;
    wherein said inactive condition is characterized by said first station set being on-hook and said active condition is characterized by said first station set being off-hook.

21. The method according to claim 20 wherein said information related to said one station set includes the current time.

22. The method according to claim 20 wherein said information related to said one station set includes the current date.

23. The method according to claim 20 wherein said information related to said one said station set includes a telephone number associated with said one station sets.

24. The method according to claim 20, wherein said sending is transmitting a frequency shift key (FSK) data message.

25. The method according to claim 20, wherein said sending is performed before said switching system presents dial tone.

26. The method according to claim 20, wherein said sending is performed while said switching system presents dial tone.

27. The method according to claim 20, wherein said signaling comprises the one station set going off-hook.

28. The method according to claim 20, wherein said sending is performed before said one station set initiates dialing.

29. A telecommunications network for establishing connections between two station sets within a plurality of station sets comprising:
    a switching system;
    a first station set served by said switching system; and
    a means for sending information related to said first station set responsive to said first station set signaling said switching system that the first station set is transitioning from an inactive condition to an active condition;
    wherein said inactive condition is characterized by said first station set being on-hook and said active condition is characterized by said first station set being off-hook.

30. The telecommunications network according to claim 29, wherein said information includes the current date.

31. The telecommunications network according to claim 29, wherein said information includes the current time.

32. The telecommunications network according to claim 29, wherein said information includes identification information related to said first station set.

33. The telecommunications network according to claim 29, wherein said identification information related to said first station set includes a telephone number associated with said first station set.

34. The telecommunications system according to claim 29, wherein said means for sending is configured to send a frequency shift key (FSK) data message.

35. The telecommunications system according to claim 29, wherein said first station set displays said information.

36. The telecommunications system according to claim 29, wherein said first station set stores said information for future use.

37. The telecommunications system according to claim 29, wherein said first station set uses said information to set at least one of an internal date and clock of the station set.

38. The telecommunications system according to claim 29, wherein said first station set is an analog phone.

39. The telecommunications system according to claim 29, wherein said first station set is a computer connected to said switching system through a modem.

40. The telecommunications system according to claim 39, wherein said computer uses said information to set at least one of an internal date and clock of the computer.

41. The telecommunications system according to claim 39, wherein said computer uses a telephone number within said information to determine a least cost terminal number when the computer can choose between a plurality of terminal numbers to dial.

42. The telecommunications system according to claim 39, wherein said computer uses a telephone number within said information to determine a terminal number when the computer can choose between a plurality of terminal numbers to dial.

43. The telecommunications system according to claim 29, wherein said sending information is performed before said switching system presents dial tone.

44. The telecommunications system according to claim 29, wherein said sending information is sent while said switching system presents dial tone.

45. The telecommunications network according to claim 29, wherein said signaling comprises the first station set going off-hook.

46. The telecommunications system according to claim 29, wherein said sending is performed before said first station set initiates dialing.

* * * * *